(12) United States Patent
Daniels et al.

(10) Patent No.: US 8,240,276 B1
(45) Date of Patent: Aug. 14, 2012

(54) SQUEEZE CHUTE APPARATUS

(76) Inventors: Danny D. Daniels, Ainsworth, NE (US); Paul O. Carpenter, Long Pine, NE (US); Wayne L. Dutrow, Ainsworth, NE (US); James A. Raymond, Ainsworth, NE (US)

( * ) Notice: Subject to any disclaimer, the term of this patent is extended or adjusted under 35 U.S.C. 154(b) by 0 days.

(21) Appl. No.: 12/932,896

(22) Filed: Mar. 9, 2011

Related U.S. Application Data

(60) Provisional application No. 61/462,403, filed on Feb. 2, 2011.

(51) Int. Cl.
*A01K 15/00* (2006.01)
*A01K 15/04* (2006.01)

(52) U.S. Cl. ......... 119/729; 119/731; 119/734; 119/738

(58) Field of Classification Search ................... 119/729, 119/730, 731, 734, 738, 743; *A01K 15/00, A01K 15/04*
See application file for complete search history.

(56) References Cited

U.S. PATENT DOCUMENTS

| | | | | |
|---|---|---|---|---|
| 3,814,060 A | * | 6/1974 | Swenson | 119/734 |
| 4,702,200 A | * | 10/1987 | Simington | 119/734 |
| 5,263,438 A | * | 11/1993 | Cummings | 119/734 |
| 5,331,923 A | * | 7/1994 | Mollhagen | 119/734 |
| 6,609,480 B2 | | 8/2003 | Daniels et al. | |
| 7,195,076 B2 | * | 3/2007 | De Vor | 168/48.1 |
| 7,770,542 B2 | * | 8/2010 | Mollhagen | 119/734 |

* cited by examiner

*Primary Examiner* — Son T Nguyen
*Assistant Examiner* — Shadi Baniani
(74) *Attorney, Agent, or Firm* — Dennis L. Thomte; Thomte Patent Law Office LLC

(57) ABSTRACT

An improved squeeze chute apparatus, which may be portable or stationary, includes a frame having an entrance end, an exit end, a first side, a second side, an upper end and a lower end. A first upstanding sidewall is positioned at the first side of the frame and a second upstanding sidewall is positioned at the second side of the frame. The sidewalls are movable between inner and outer positions with respect to the frame. First and second entrance gate members, which are movable between open and closed positions, are positioned at the entrance end of the frame. First and second exit gate members, which are movable between open and closed positions, are positioned at the exit end of the frame. The gate members and sidewalls are operated by hydraulic cylinders having resilient mounts at the base and rod ends thereof. Each of the gate members has two hydraulic cylinders connected thereto. Each of the sidewalls has four hydraulic cylinders connected thereto.

19 Claims, 15 Drawing Sheets

SQUEEZE CHUTE APPARATUS

CROSS-REFERENCE TO RELATED APPLICATION

This application claims the benefit of Provisional Application Ser. No. 61/462,403, filed Feb. 2, 2011, entitled A SQUEEZE CHUTE APPARATUS.

BACKGROUND OF THE INVENTION

1. Field of the Invention

This invention relates to livestock handling equipment and more particularly to a squeeze chute for selectively immobilizing an animal in a standing position to allow any number of operations to be safely performed on the animal.

2. Description of the Related Art

In livestock operations it is often necessary to restrain the animals for palpating, immunizing, branding, treating, weighing, loading, etc. Corrals, loading chutes, alleyways, pens, and the like, have heretofore been constructed and employed by livestock operators and veterinarians for these purposes. These structures are often constructed permanently from materials such as stone, barbed wire, wooden rails, steel pipe, and the like. However the capital investment required for such permanent structures is often prohibitive to ranchers having small operations, particularly those that operate their livestock on small isolated tracts of grazing land. Furthermore, many such ranchers lease, rather than own, their grazing land and naturally wish to avoid making permanent, fixed improvements.

A common solution to this problem is to physically transport the livestock to a remote location having the necessary equipment. However, transporting a herd of large animals tends to be relatively time-consuming and expensive. A round trip from the grazing pasture to a treatment facility requires loading, transporting, and unloading the animals twice. Naturally, the time and expense associated with transporting livestock increases with the distances and number of animals involved.

A disadvantage with many prior art portable animal handling devices is that large animals can be hazardous to workers trying to direct and control them with such equipment. Animals that are unaccustomed to confinement frequently balk at entering confining structures and may even panic. After being restrained, an animal may then suddenly begin kicking or attempt to climb up or back out of the chute. Many of the prior art animal-working structures provide little or no protection from such hazards.

Squeeze chutes can be provided with hydraulic power systems for opening and closing their gates and constricting and expanding their sidewalls to reduce or expand the size of the enclosure in which animals are received. Hydraulic power systems have the advantage of permitting control of the operable components from a single control station. However, these control systems are typically located in a fixed position at one end of the squeeze chute. This can limit the operators view of the work being performed on the animal and typically limits the placement of the squeeze chute with respect to permanent structures located nearby.

Prior to the invention disclosed in assignee's prior U.S. Pat. No. 6,609,480, the prior art squeeze chutes were usually provided with sides that pivot inwardly in order to squeeze livestock. Since the distance between the sides at the bottom must conform substantially to the width of the animal, this type of chute requires adjustment in the spacing of the sides if both large and small animals are to be handled. It is also difficult for large animals to enter or be driven into the chute because its width at the bottom is barely sufficient to accommodate the animal. In addition, the manner in which the sides pivot tends to shock or excite the animal and often causes the animal to lose its balance. The construction of the sides of existing squeeze chutes presents an additional problem in that the sides obstruct access to much of the animal's body, making examination and other operations on the animal difficult.

Another problem with many prior art squeeze chutes, prior to the invention disclosed in U.S. Pat. No. 6,609,480, relates to the operation of their gates. Squeeze chute gates often include a pair of panels, which are pivotally mounted on the squeeze chute frame so that they traverse arcs when they are moved between their open and closed positions. This motion tends to swing the panels into the faces of the animals, contributing to the animal's stress and sense of distress.

During particular treatment operations, the head of the animal must be firmly held in place to avoid injury to both the animal and the operator. For example, the application of ear tags, implants or other medicaments in the animal's ear is accomplished more safely if the animal's head is substantially immobilized. The same is true during the examination of the animal's eyes, ears and teeth. It is further preferred that the animal's neck be fully exposed and nearly motionless when taking blood samples from or making injections of any kind of serum into the animal's neck.

The methods of substantially immobilizing the animal's head, prior to U.S. Pat. No. 6,609,480, all require substantial physical effort by the operator. Nearly all of those methods include use of a stanchion either fixed or formed as a part of a portable chute such as those used for de-horning. The animal is held in the stanchion to keep its body confined. Then, a tray or platform may be placed under the animal's head, which is pressed against the tray to hold it in place. An alternative prior art method uses fixed length arms, which extend outwardly from the stanchion gate. These arms are typically not adjustable and generally need to be used in combination with a nose ring and rope. If the animal becomes excited when this method is used, it is necessary for the operator to hold the head until the nose ring can be inserted and the rope tied before the desired operation can be carried out.

Prior art squeeze chute designs, prior to U.S. Pat. No. 6,609,480, typically limit the operator's ability to safely enter the rearward end of the chute, behind the animal, without compromising the physical restraint of the animal. Furthermore, such prior art designs are incapable of selectively immobilizing the animal's hip area without increasing the transverse squeeze pressure exerted by the opposing sidewalls. Accordingly, even if the operator is able to enter the chute behind the animal, simple animal husbandry operations are made difficult if not dangerous.

As the animals are worked, some may have a tendency to lie down or even collapse under the surrounding conditions. Prior art squeeze chutes, prior to U.S. Pat. No. 6,609,480, typically do not provide for a method of selectively and adjustably supporting the animal's abdomen. This not only increases the difficulty of working the animal but compromises the safety of the animal.

The squeeze chute of assignee's prior U.S. Pat. No. 6,609,480 solved a majority, if not all, the problems associated with squeeze chutes. The instant invention is regarded as a significant improvement over assignee's earlier squeeze chute in that the noise associated with squeeze chutes has been greatly reduced in the present invention. The instant invention reduces much of the metal to metal contact of moving parts thereby decreasing the noise associated therewith while providing an increase in the durability of the squeeze chute. The operation of the instant squeeze chute is extremely smooth and quick.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A squeeze chute apparatus is disclosed which includes an elongated frame in the form of a chute having upper and lower ends, a first side, a second side, an entrance or tail end and an exit or head end. First and second horizontally movable entrance gate members are secured to the frame at the entrance end of the frame and first and second vertically disposed exit gate members are horizontally movably secured to the frame at the exit end of the frame. A first upstanding sidewall is provided at the first side of the frame and is movable between inner and outer positions. A second sidewall is positioned at the second side of the frame and is movable between inner and outer positions. When the sidewalls are in their inner position, they squeeze or crowd the animal in the squeeze chute.

The entrance gate members, the exit gate members, and the sidewalls are moved by means of hydraulic cylinders attached thereto. Each of the cylinders has a resilient mount at its base end and a resilient mount at its rod end which reduces the noise normally associated with the movement of the entrance gates, the exit gates and the sidewalls. Further, the resilient mounts at the base end and rod end of the hydraulic cylinders reduce metal-to-metal contact thereby reducing the amount of maintenance and/or repair normally associated with a squeeze chute apparatus. The four hydraulic cylinders which control the operation of the entrance gate members are fluidly connected in series. The four hydraulic cylinders which operate the exit gate members are fluidly connected in series. The four hydraulic cylinders at the exit end of the sidewalls are fluidly series connected. The four hydraulic cylinders at the entrance ends of the sidewalls are fluidly connected in series.

A neck stretcher assembly is provided at the exit end of the frame to immobilize the head of the animal within the squeeze chute apparatus.

It is therefore a principal object of the invention to provide an improved squeeze chute apparatus.

A further object of the invention is to provide a squeeze chute apparatus wherein the hydraulic cylinders which operate the entrance gates, exit gates and sidewalls have a resilient mount at the base end thereof and a resilient mount at the rod end thereof.

A further object of the invention is to provide a squeeze chute apparatus which may be either portable or stationary.

A further object of the invention is to provide a squeeze chute apparatus which is very quiet in operation.

A further object of the invention is to provide a squeeze chute apparatus including means for reducing the maintenance and repair costs associated therewith.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
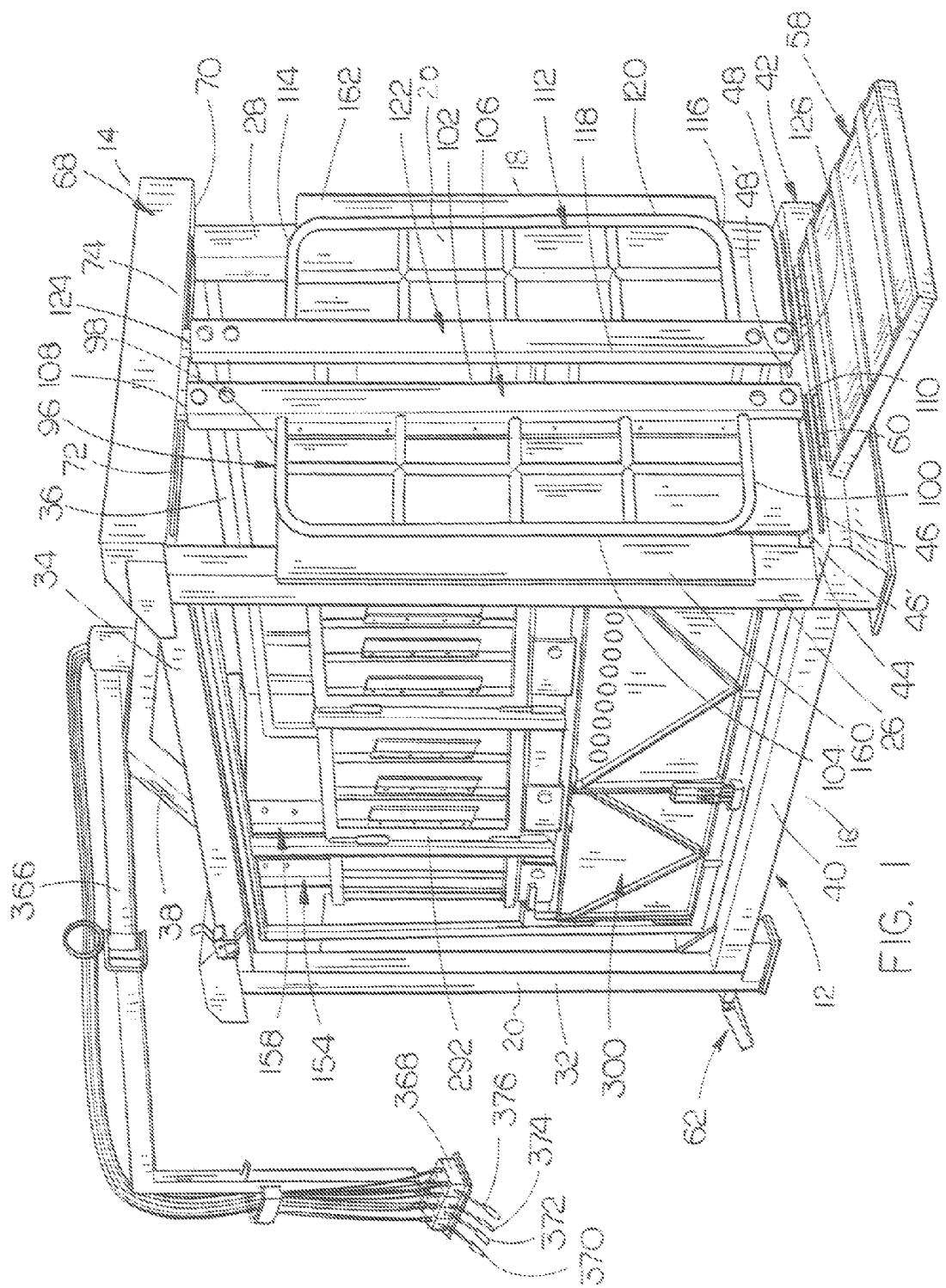
FIG. 1 is a perspective view of the squeeze chute of this invention as viewed from the entrance end thereof.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The squeeze chute of this invention is referred to generally by the reference numeral 10. The squeeze chute 10 may have wheels associated therewith so as to be portable or may be stationary. Squeeze chute 10 generally includes a frame 12 having an upper end 14, lower end 16, first side 18, second side 20, entrance end 22 and exit end 24. Frame 12 includes upstanding frame members 26 and 28 at the entrance end 22 thereof and upstanding frame members 30 and 32 at exit end 24. A horizontally disposed frame member 34 is secured to the upper ends of frame members 26 and 32 and extends therebetween. A horizontally disposed frame member 36 is secured to the upper ends of frame members 28 and 30 and extends therebetween. An arch-like frame member 38 is secured to frame members 34 and 36 and extends therebetween at the center lengths thereof.

A horizontally disposed frame member 40 is secured to frame members 26 and 32 at the lower ends thereof and extends therebetween. A horizontally disposed frame member identical to frame member 40 is secured to frame members 28 and 30 and extends therebetween at the lower ends thereof.

Frame 12 also includes a frame member 42 which is secured to and extends between the lower ends of frame members 26 and 28. A top wall 44 having transversely extending slots 46 and 48 is positioned at the upper end of frame member 42. Top wall 44 also has transversely extending slots 46' and 48' formed therein forwardly of slots 46 and 48 respectively. Frame 12 further includes a frame member 50 which extends between the lower ends of frame members 30 and 32. A top wall 52 is positioned at the upper end of frame member 50 and has transversely extending slots 54 and 56 formed therein. Top wall 52 also has transversely extending slots 54' and 56' formed therein rearwardly of slots 54 and 56 respectively. A floor 57 extends between the entrance end 22 and exit end 24 of frame 12.

Figure 2:
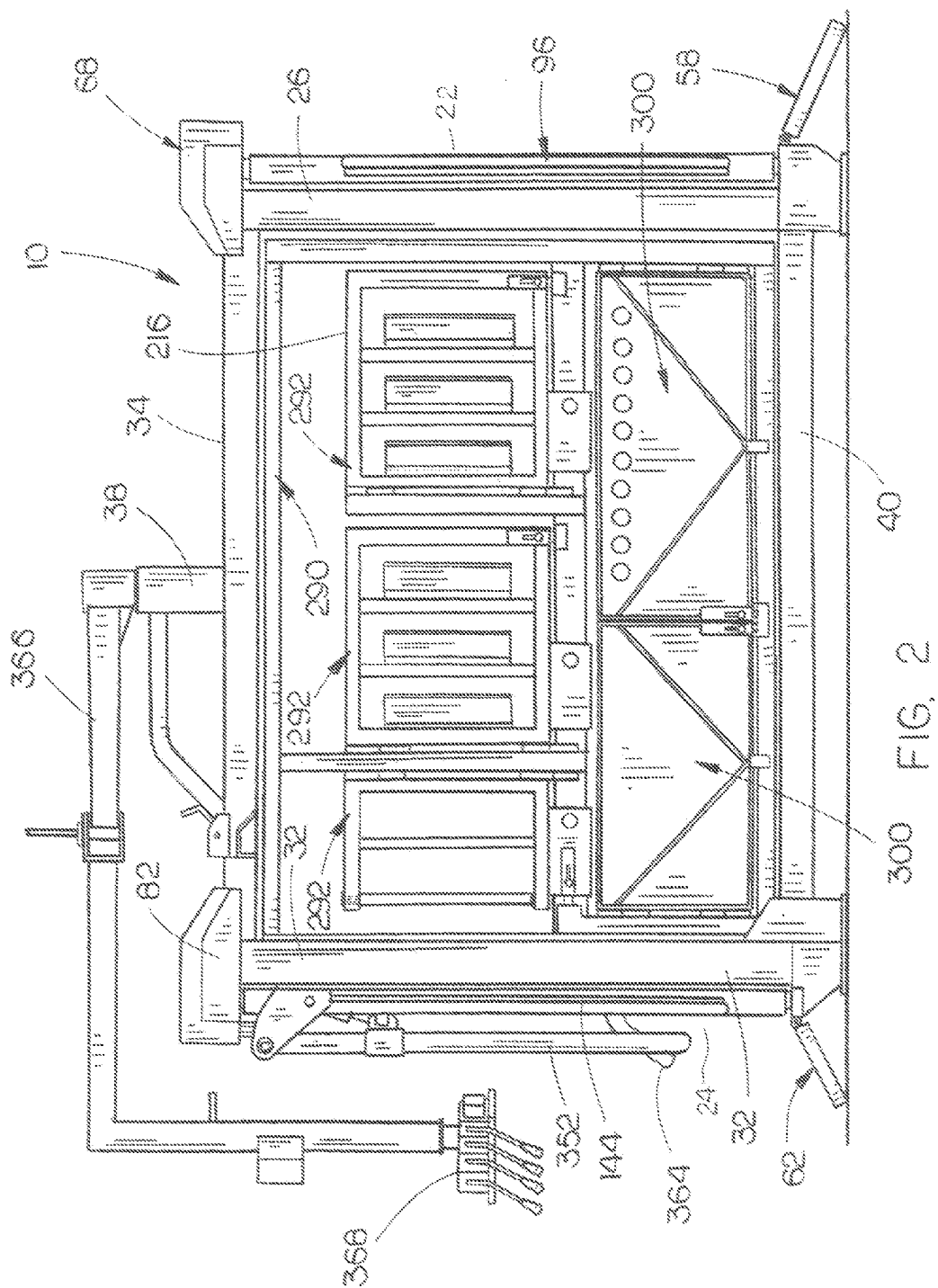
FIG. 2 is a side view of the squeeze chute of this invention.
Figure 3:
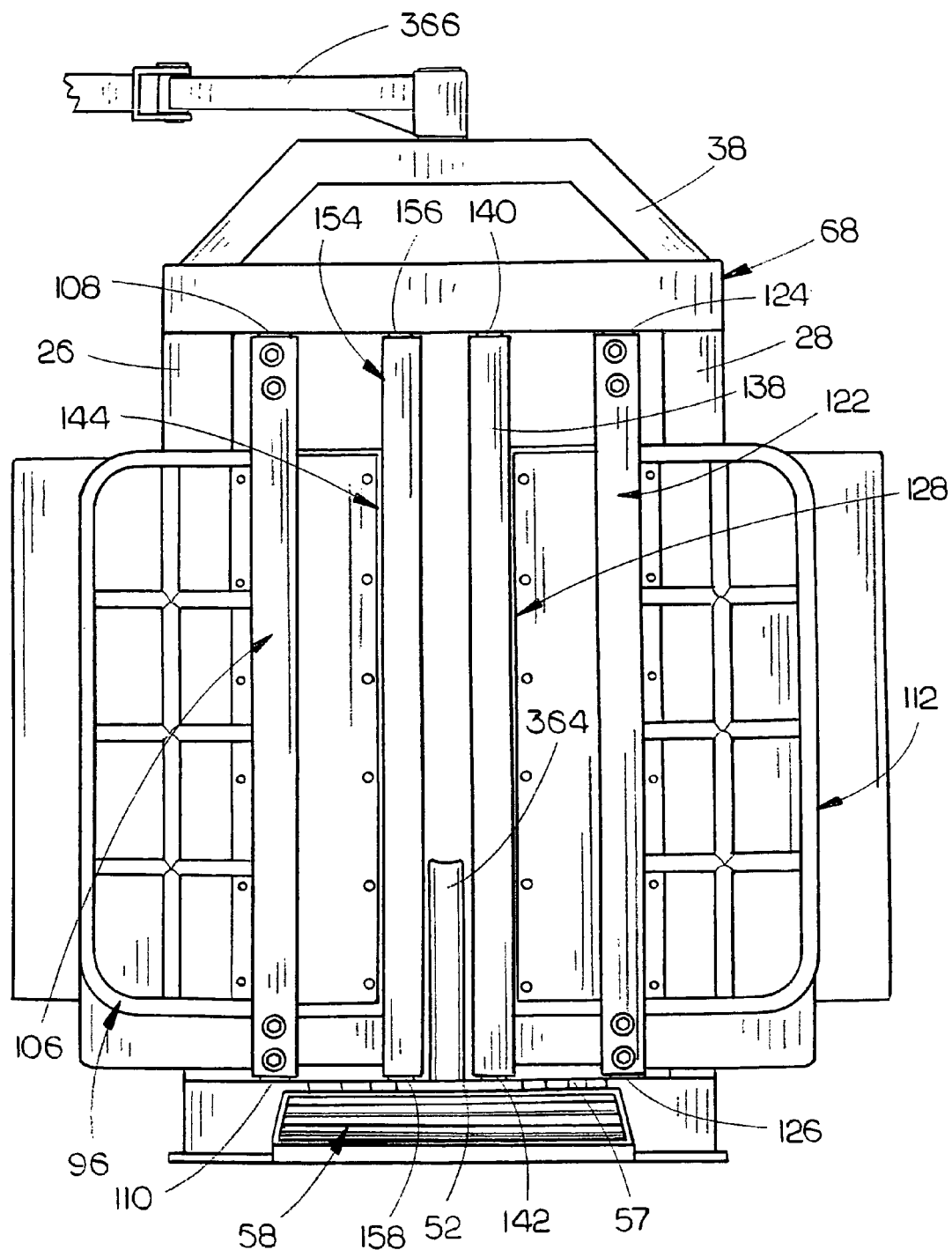
FIG. 3 is a partial end view of the squeeze chute of this invention as viewed from the entrance end thereof and which illustrates the entrance gate members in an open position and the exit gate members in a closed position.
Figure 4:
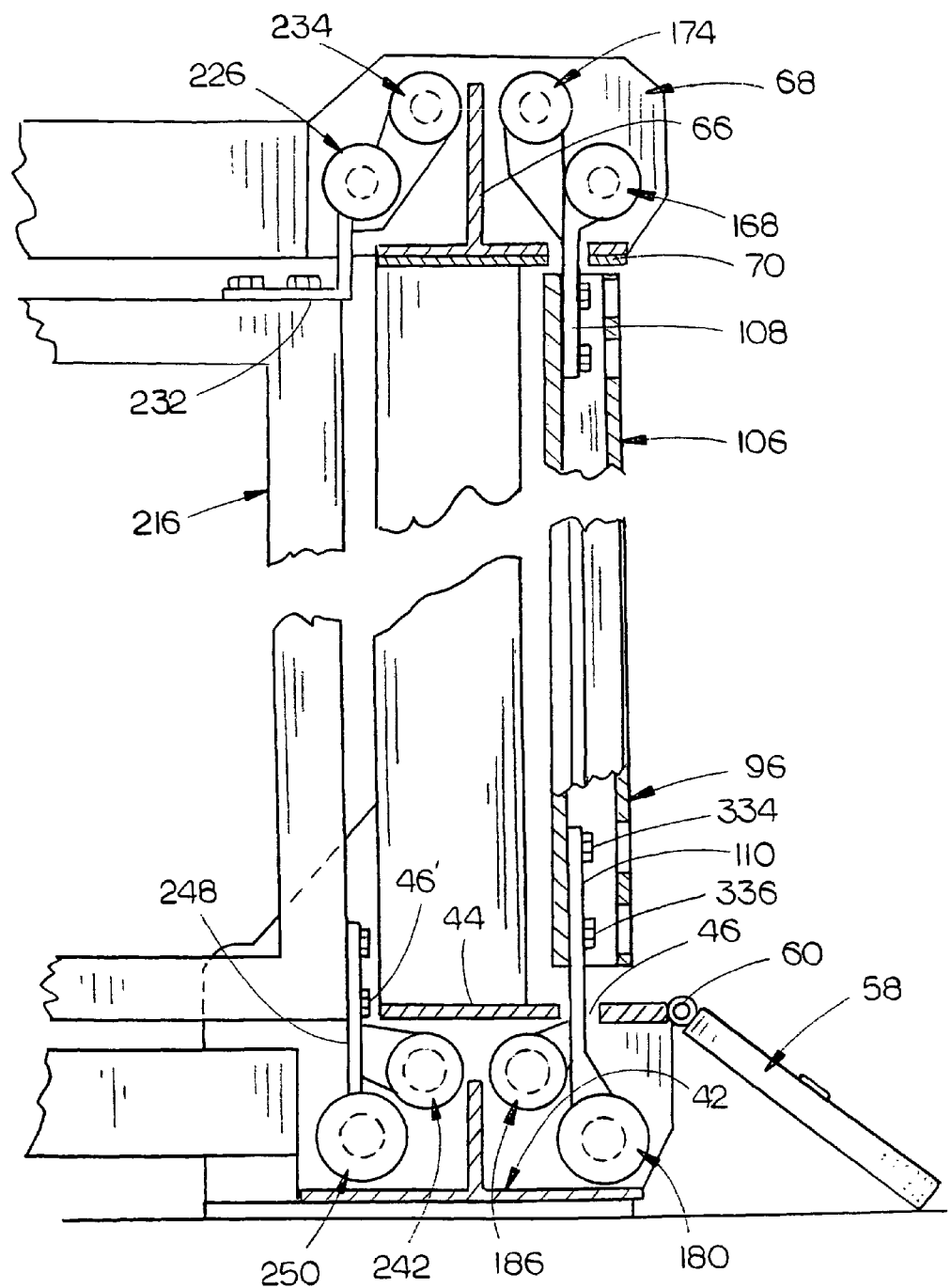
FIG. 4 is a partial side view of the entrance end of the squeeze chute of this invention with portions thereof cutaway to more fully illustrate the invention.
Figure 5:
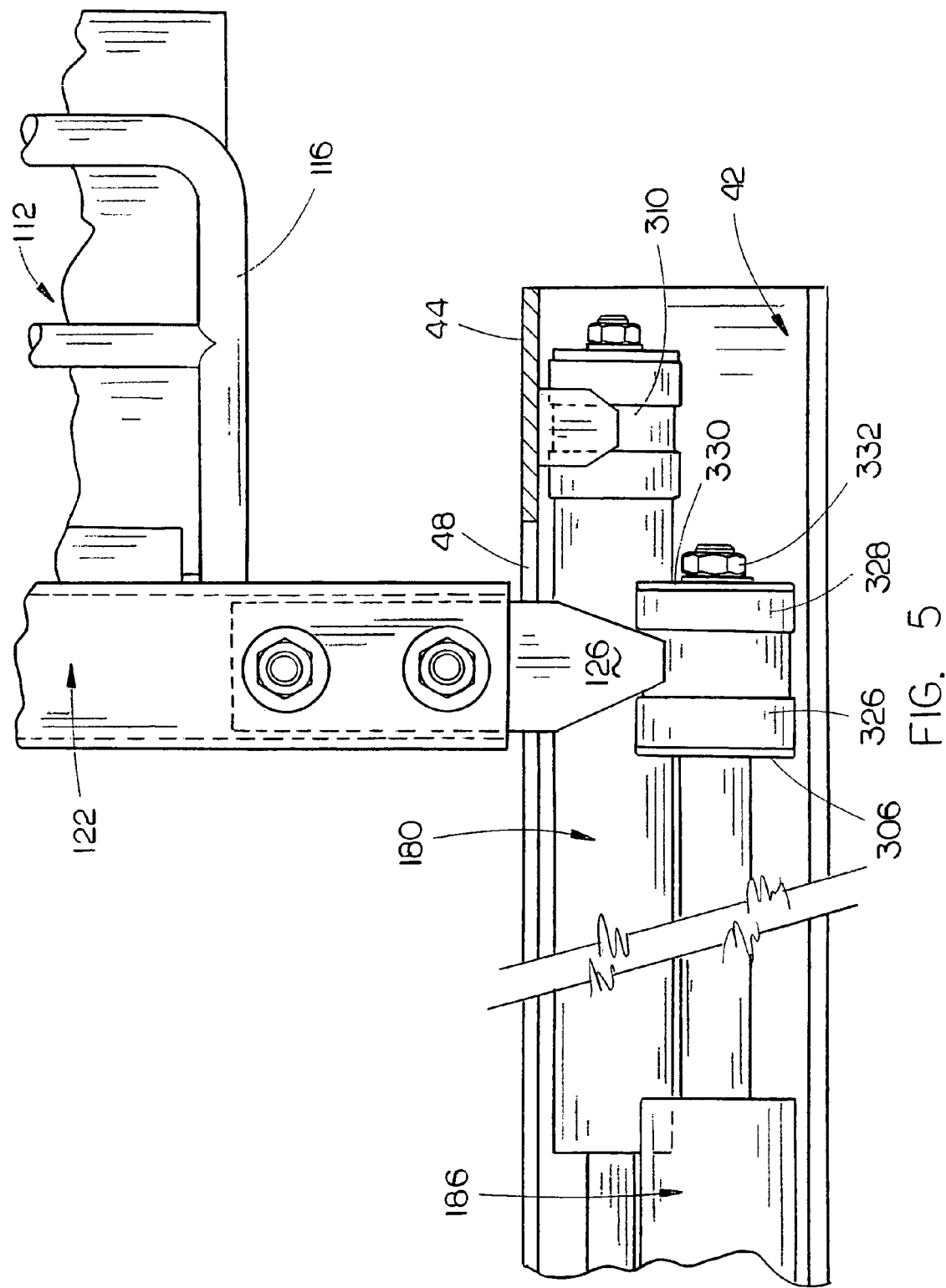
FIG. 5 is a partial end view of the lower end of the entrance end of the squeeze chute of this invention with the second entrance gate member in its open position.
Figure 6:
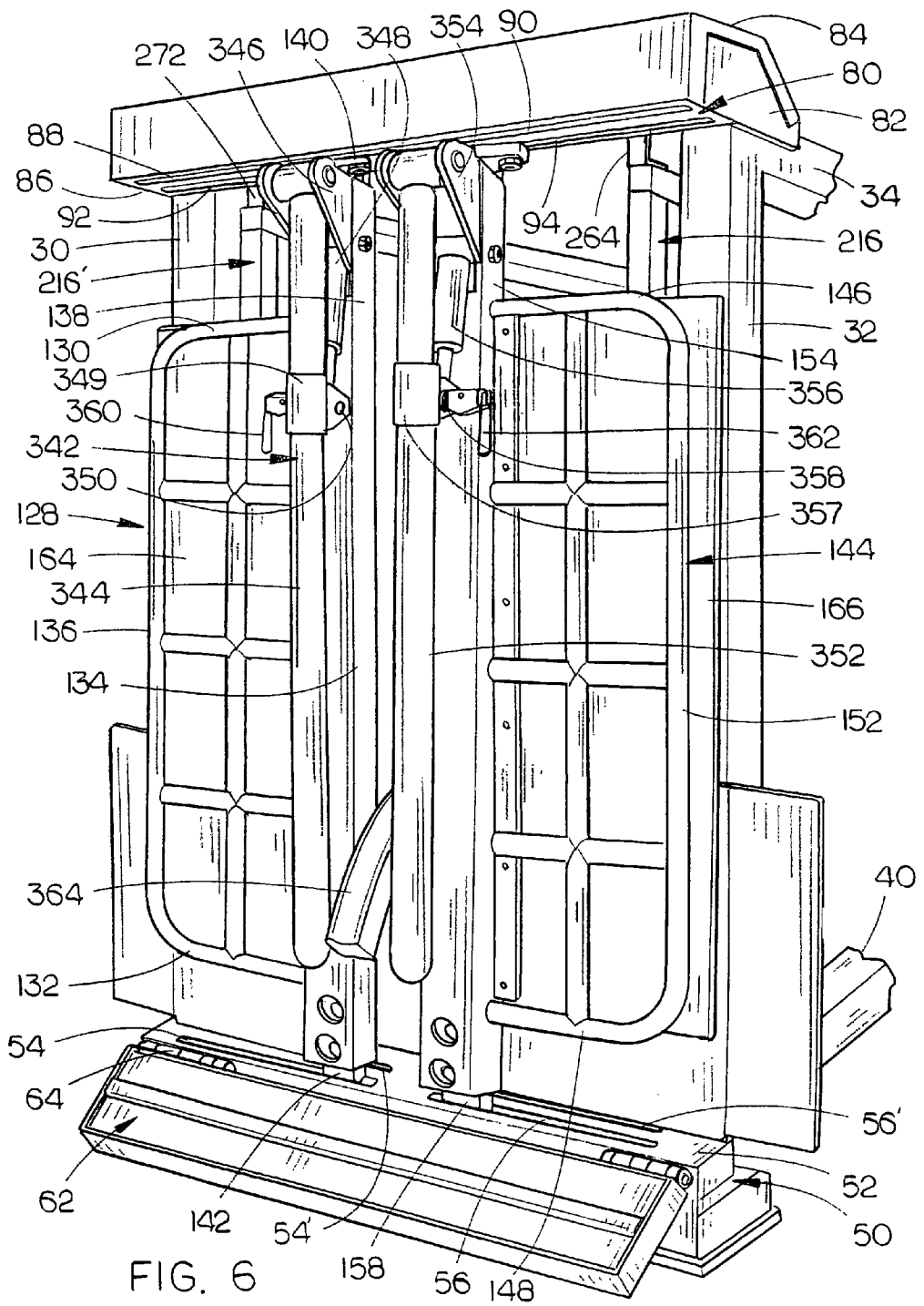
FIG. 6 is a partial perspective view of the exit end of the squeeze chute of this invention with the exit gate members in a closed position.
Figure 7:
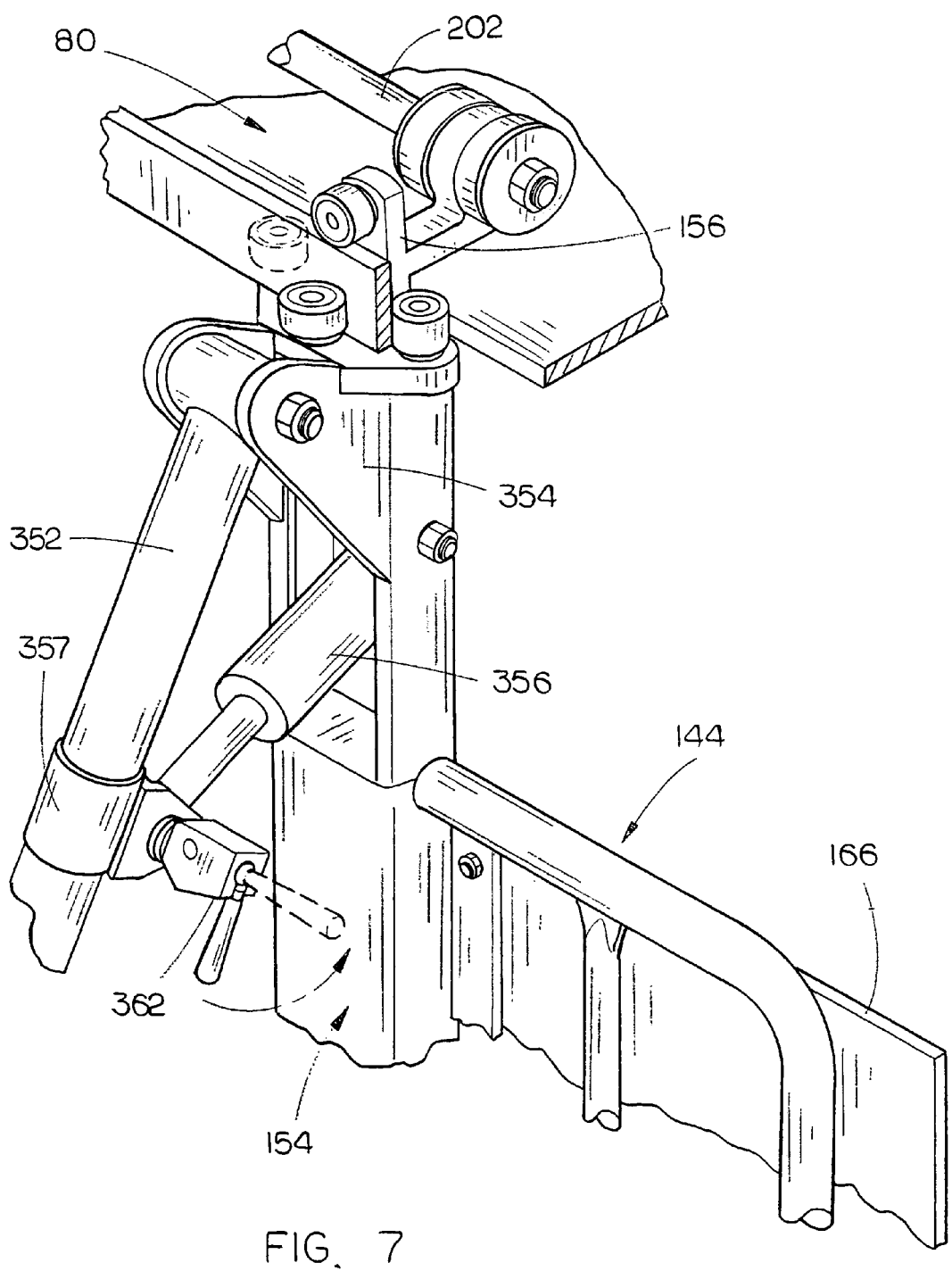
FIG. 7 is a partial perspective view of the upper end of one of the neck stretcher devices of this intention.
Figure 8:
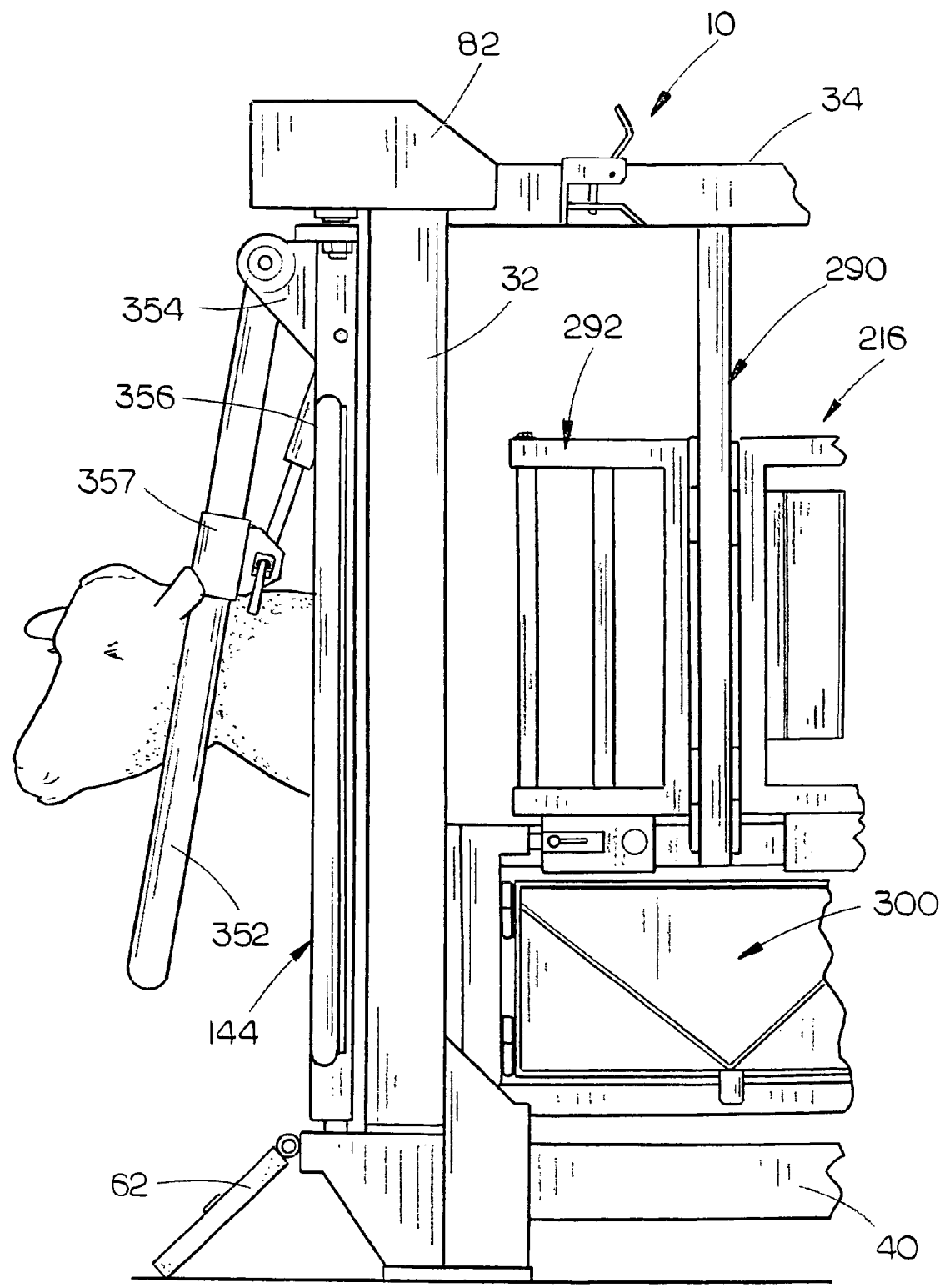
FIG. 8 is a partial side view of the squeeze chute of this invention which illustrates the neck stretcher devices in an operative position.

An entrance ramp 58 is pivotally secured to frame member 42 by hinges 60 and is pivotally movable between an upright stored position and an operative working position. FIGS. 1-3 illustrate the entrance ramp 58 in its operative working position. An exit ramp 62 is pivotally secured to frame member 50 by hinges 64 and is pivotally movable between an upright stowed position and an operative working position as seen in FIG. 6. FIGS. 1 and 6 illustrate the exit ramp 62 in its operative working position.

A horizontally disposed frame member 66 is secured to and extends between the upper ends of frame members 26 and 28 which are enclosed by a box-like housing 68 including a pivotal cover which selectively closes the upper end thereof. Frame member 66 includes a floor or bottom wall 70 having rearwardly positioned and transversely extending slots 72 and 74 formed therein and forwardly positioned and transversely extending slots 76 and 78 formed therein.

A horizontally disposed frame member 80 is secured to and extends between the upper ends of frame members 30 and 32 and is enclosed by a box-like housing 82 including a pivotal cover 84 which selectively closes the upper end thereof. Frame member 80 includes a floor or bottom wall 86 having forwardly positioned and transversely extending slots 86 and 90 formed therein and rearwardly positioned and transversely extending slots 92 and 94 formed therein.

The numeral 96 refers to a first entrance gate member having an upper end 98, a lower end 100, an inner end 102 and an outer end 104. Gate member 96 has a vertically disposed support 106 at its inner end which has a bracket 108 extending upwardly therefrom and a bracket 110 which extends downwardly therefrom. Bracket 108 extends from support 106 upwardly through slot 72 in floor 70. Bracket 110 extends from support 106 downwardly through slot 46 in top wall 44.

The numeral 112 refers to a second entrance gate member having an upper end 114, a lower end 116, an inner end 118 and an outer end 120. Gate member 112 has a vertically disposed support 122 at its inner end which has a bracket 124 extending upwardly therefrom and a bracket 126 which extends downwardly therefrom. Bracket 124 extends from support 106 upwardly through slot 74 in floor 70. Bracket 126 extends from support 122 downwardly through slot 48 in top wall 44.

The numeral 128 refers to a first exit gate member having an upper end 130, a lower end 132, an inner end 134 and an outer end 136. Gate member 128 has a vertically disposed support 138 at its inner end which has a bracket 140 extending upwardly therefrom and a bracket 142 which extends downwardly therefrom. Bracket 140 extends from support 138 upwardly through slot 88 in floor 86. Bracket 142 extends from support 128 downwardly through slot 54 in top wall 52.

The numeral 144 refers to a second exit gate member having an upper end 146, a lower end 148, an inner end 150 and an outer end 152. Gate member 144 has a vertically disposed support 154 at its inner end which has a bracket 156 extending upwardly therefrom and a bracket 158 which extends downwardly therefrom. Bracket 156 extends from support 154 upwardly through slot 90 in floor 86. Bracket 158 extends from support 154 downwardly through slot 56 in top wall 52.

Preferably, the brackets 106 and 124 on the supports 106 and 122 of entrance gate members 96 and 112 respectively have rollers mounted thereon which roll upon the upper surface of floor 70 of housing 68 to support the entrance gate members 96 and 112 so that they may be moved transversely with respect to the frame 12 between open and closed positions. Preferably, the brackets 122 and 140 on the supports 122 and 154 of exit gate members 128 and 144 respectively have rollers mounted thereon which roll upon the upper surface of floor 86 of housing 82 to support the exit gate members 128 and 144 so that they may be moved transversely with respect to the frame 12 between open and closed positions. Preferably, flat panels 160, 162, 164 and 166 are mounted on the inside surfaces of gate members 96, 112, 128 and 144 respectively.

The numeral 168 refers to a horizontally disposed hydraulic cylinder which is positioned in housing 68. The base end 170 of hydraulic cylinder 168 is secured to frame member 66 and has its rod end 172 secured to the upper end of bracket 108 which extends upwardly from support 106 of entrance gate member 96. The numeral 174 refers to a horizontally disposed hydraulic cylinder which is positioned in housing 68. The base end 176 of hydraulic cylinder 174 is secured to frame member 66 and has its rod end 178 secured to the upper end of bracket 124 which extends upwardly from support 122 of entrance gate member 112. A horizontally disposed hydraulic cylinder 180 has its base end 182 secured to frame member 42 and has its rod end 184 secured to the lower end of bracket 110 which extends downwardly from support 106 of entrance gate member 96. A horizontally disposed hydraulic cylinder 186 has its base end 188 secured to frame member 42 and has its rod end 190 secured to the lower end of bracket 126 which extends downwardly from support 122 of entrance gate member 112.

The numeral 192 refers to a horizontally disposed hydraulic cylinder which is positioned in housing 82. The base end 194 of hydraulic cylinder 192 is secured to frame member 80 and has its rod end 196 secured to the upper end of bracket 140 which extends upwardly from support 138 of exit gate member 128. The numeral 198 refers to a horizontally disposed hydraulic cylinder which is positioned in housing 82. The base end 200 of hydraulic cylinder 198 is secured to frame member 80 and has its rod end 202 secured to the upper end of bracket 156 which extends upwardly from support 154 of exit gate member 144. A horizontally disposed hydraulic cylinder 204 has its base end 206 secured to frame member 50 and has its rod end 208 secured to the lower end of bracket 142 which extends downwardly from support 154 of exit gate member 128. A horizontally disposed hydraulic cylinder 210 has its base end 212 secured to frame member 50 and has its rod end 214 secured to the lower end of bracket 158 which extends downwardly from support 154 of exit gate member 144.

The numeral 216 refers to a sidewall which is movably secured to frame 12 at side 18 and which extends between the entrance and exit ends of frame 12. Sidewall 216 includes an upper end 218, lower end 220, entrance end 222 and exit end 224. As will be explained hereinafter, sidewall 216 is selectively movable in a generally transverse direction with respect to frame 12 between open and closed positions. The numeral 216 refers to a sidewall which is movably secured to frame 12 at side 20 and which extends between the entrance and exit ends of frame 12. Inasmuch as sidewall 216' is identical to sidewall 216, only sidewall 216 will be described in detail.

A horizontally disposed hydraulic cylinder 226 has its base end 228 secured to frame member 66 and has its rod end 230 secured to bracket 232 which is secured to the upper end 218 of sidewall 2216 at the entrance end 222 thereof. A horizontally disposed hydraulic cylinder 234 has its base end 236 secured to frame member 66 and has its rod end 238 secured to bracket 240 which is secured to the upper end of sidewall 216' at the entrance end thereof.

A horizontally disposed hydraulic cylinder 242 has its base end 244 secured to frame member 42 and has its rod end 246 secured to bracket 248 which is secured to the lower end 220 of sidewall 216 at the entrance end 222 thereof. A horizontally disposed hydraulic cylinder 250 has its base end 252 secured to frame member 42 and has its rod end 254 secured to bracket 256 which is secured to the lower end of sidewall 216' at the entrance end thereof.

A horizontally disposed hydraulic cylinder 258 has its base end 260 secured to frame member 80 and has its rod end 262 secured to bracket 264 which is secured to the upper end 218 of sidewall 216 at the exit end 222 thereof. A horizontally disposed hydraulic cylinder 266 has its base end 268 secured to frame member 80 and has its rod end 270 secured to bracket 272 which is secured to the upper end of sidewall 216' at the exit end thereof.

A horizontally disposed hydraulic cylinder 274 has its base end 276 secured to frame member 50 and has its rod end 278 secured to bracket 280 which is secured to the lower end 220 of sidewall 216 at the exit end 222 thereof. A horizontally disposed hydraulic cylinder 282 has its base end 284 secured to frame member 50 and has its rod end 286 secured to bracket 288 which is secured to the lower end of sidewall 216' at the exit end thereof.

Figure 9:
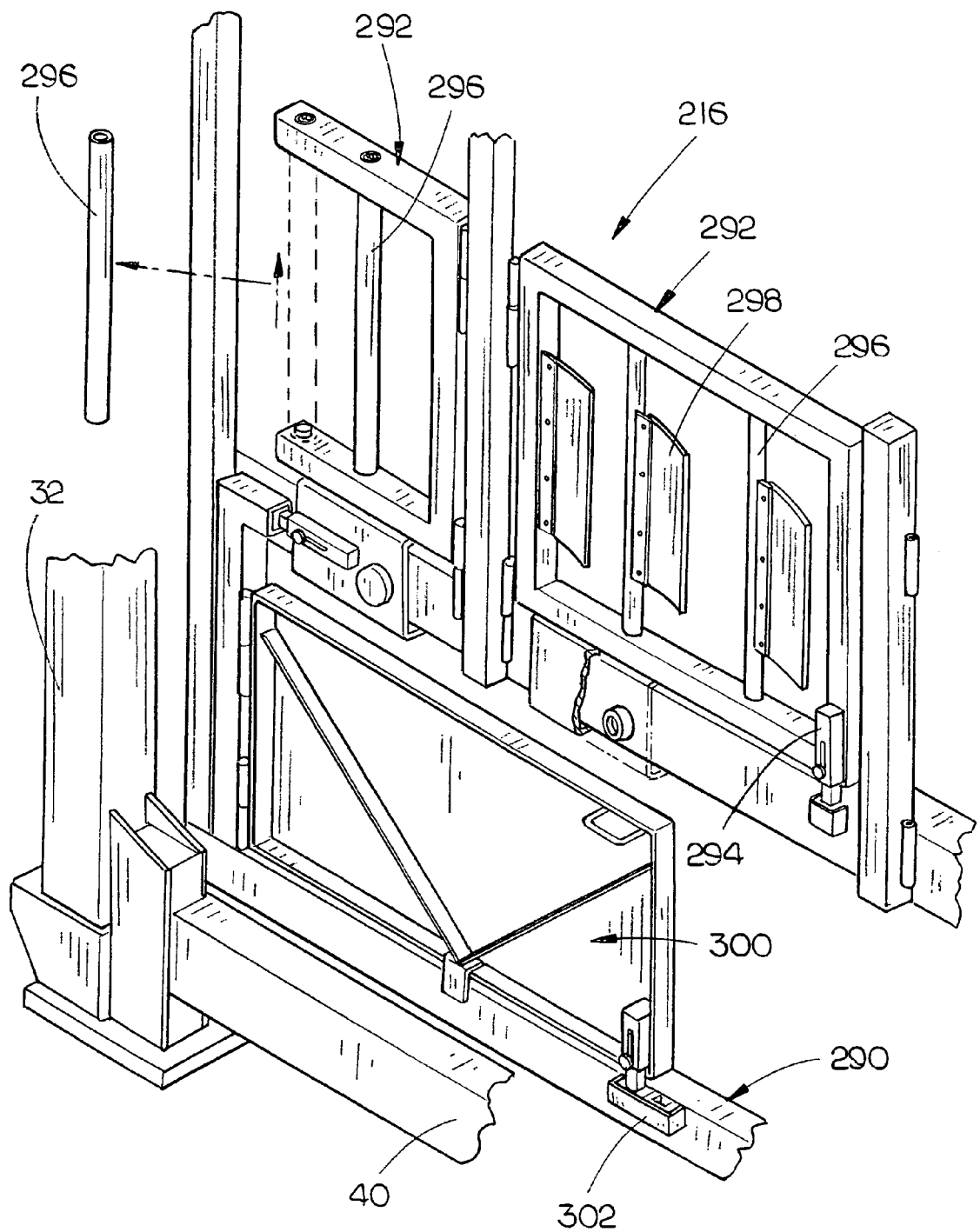
FIG. 9 is a partial perspective view of one of the side panels of the squeeze chute of this invention.
Figure 10:
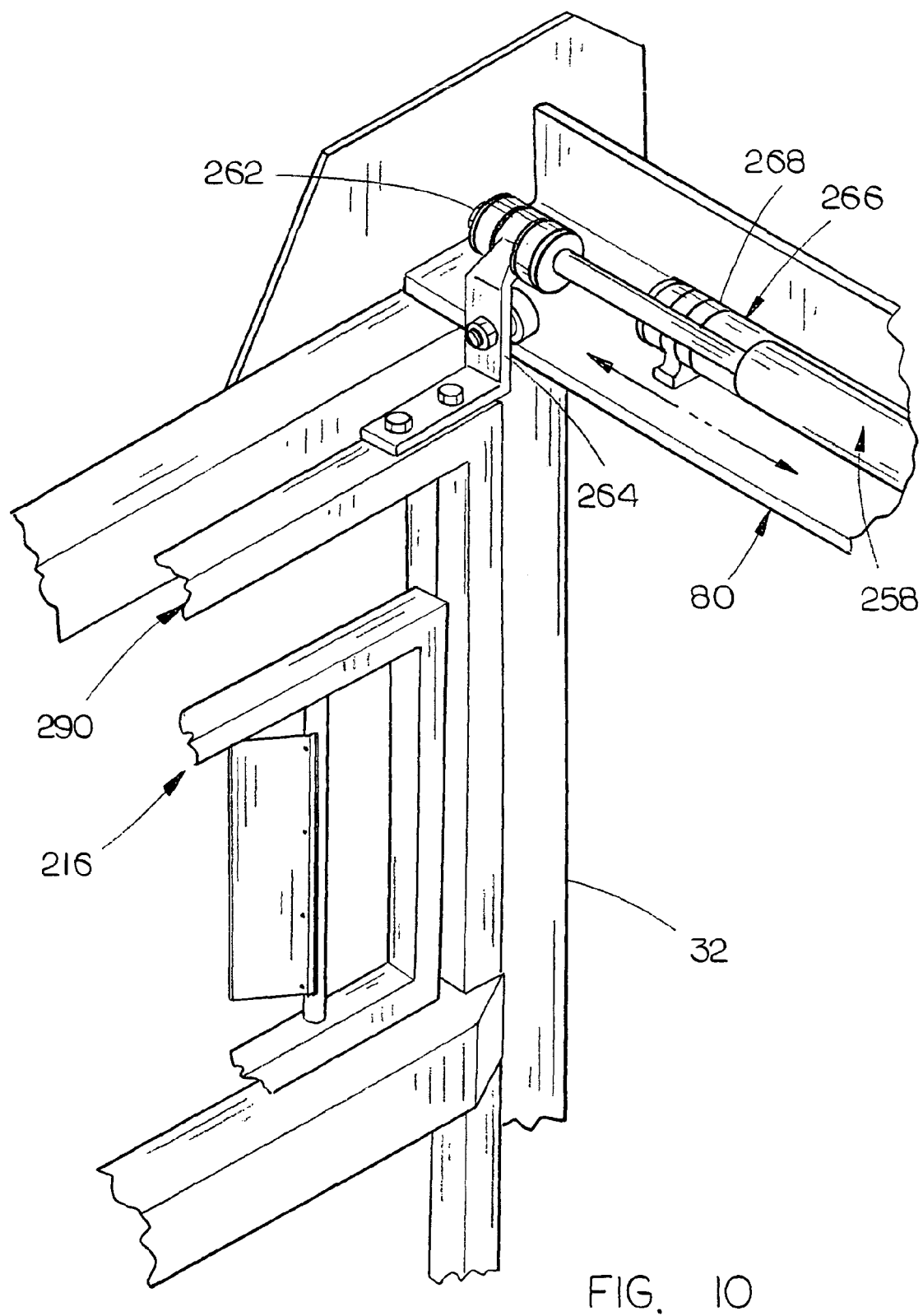
FIG. 10 is a partial perspective view of the upper inside of one of the side panels.
Figure 11:
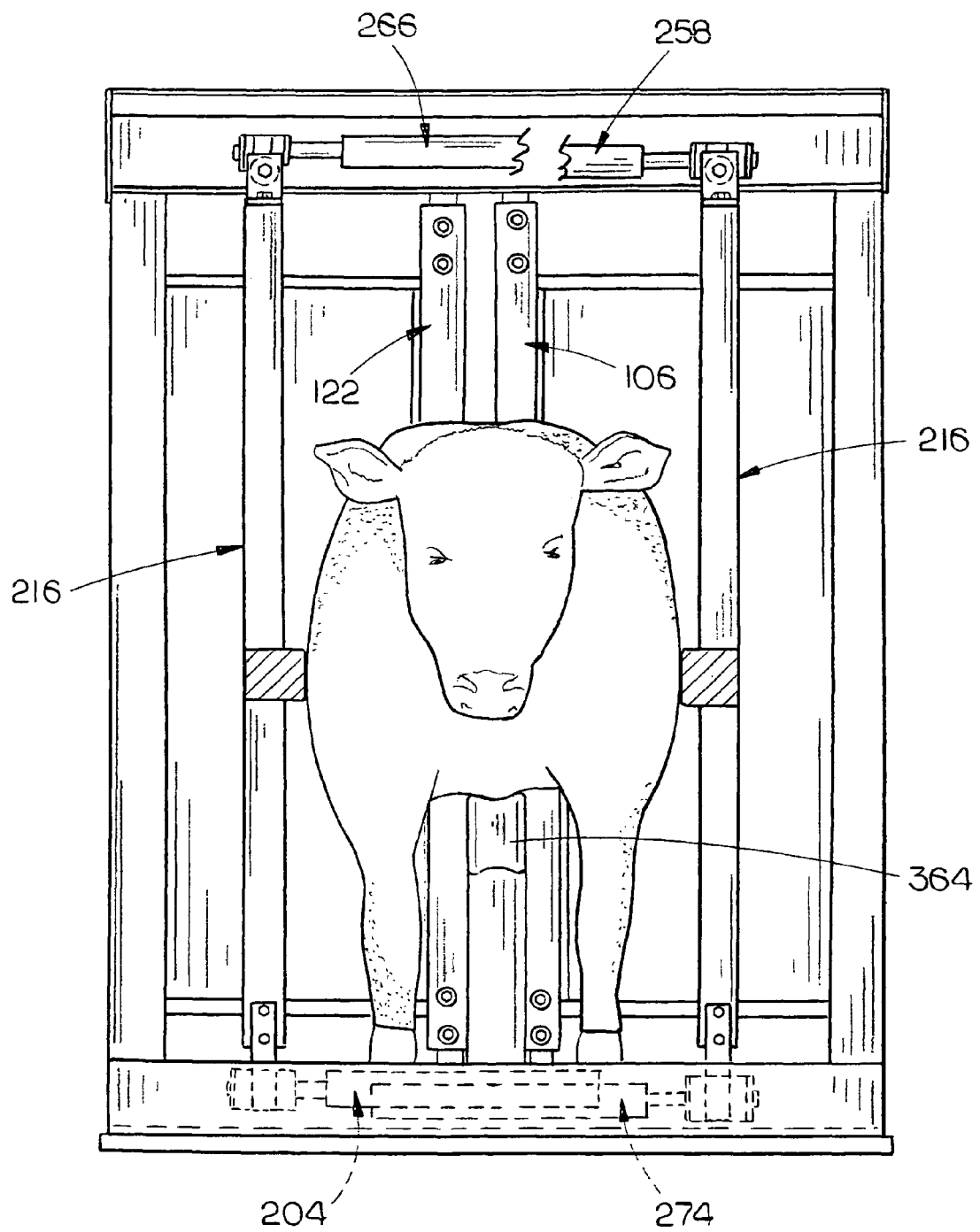
FIG. 11 is a partial end elevational view as seen from the entrance end of the squeeze chute which illustrates the side panels in their closed or innermost position.

Sidewall 216 includes a framework 290 which has a plurality of upper door member 292 pivotally secured thereto about a vertical axis so that the door members 292 may be opened or closed and held in the closed position by latches 294. Preferably, some of the vertical bars 296 are selectively removably mounted in the door member 292 as illustrated in FIG. 9 to provide additional access to the animal in the squeeze chute without opening the door member. Preferably, some of the vertical bars 296 have flexible flaps 298 secured thereto. A plurality of lower door members 300 are also pivotally mounted in the framework 290 about a vertical axis so that the door members 300 may be moved between open and closed positions. Latches 302 hold the door members 300 in their closed positions. The structure of sidewall 216' is identical to that of sidewall 216 as previously stated.

Figure 12:
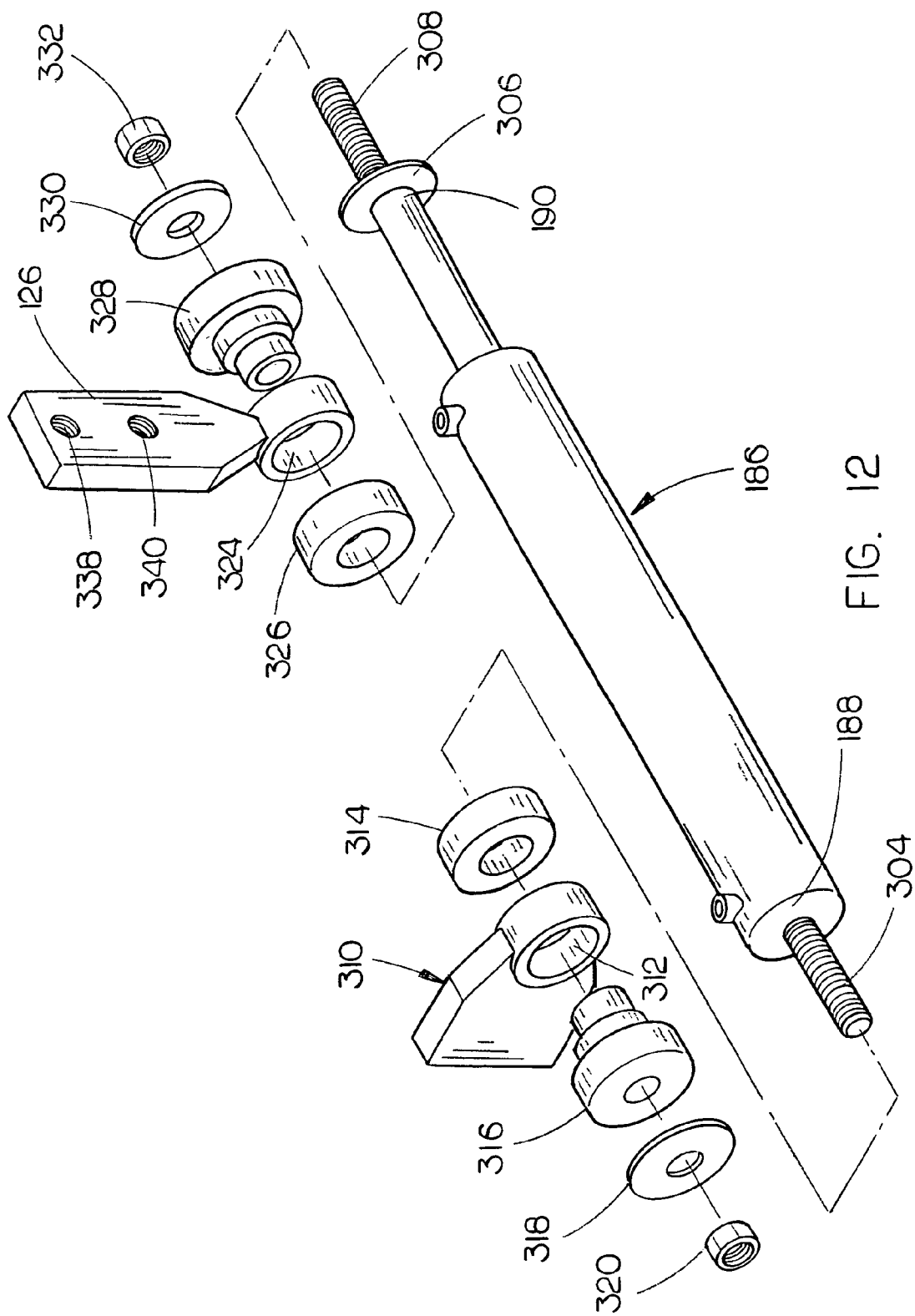
FIG. 12 is an exploded perspective view of one of the hydraulic cylinders of the squeeze chute of this invention.
Figure 13:
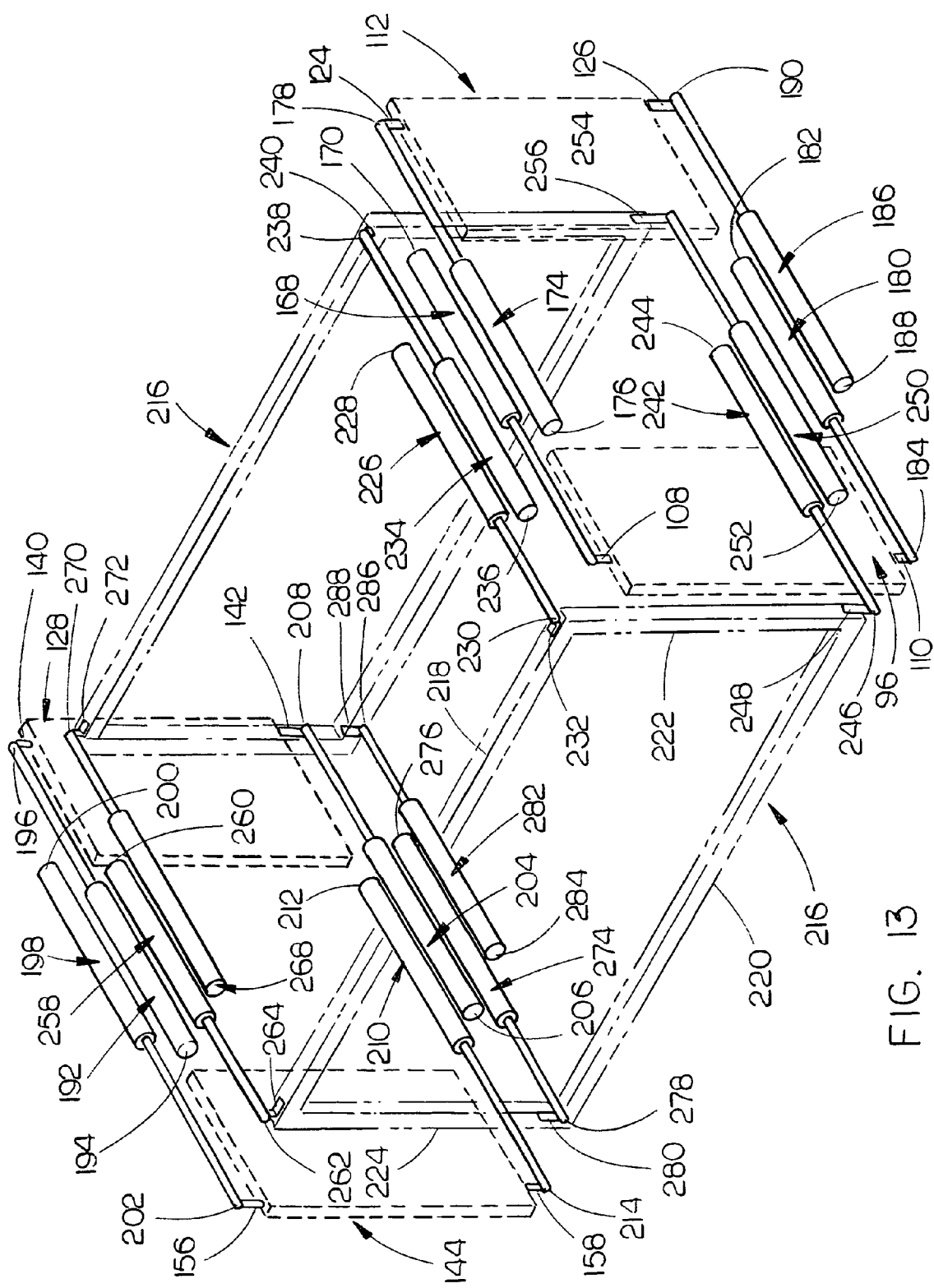
FIG. 13 is a perspective schematic view illustrating the hydraulic cylinders of the invention and their relationship to the gate members and side panels.

FIG. 12 illustrates the unique structure of this invention for mounting the hydraulic cylinders of the squeeze chute. In FIG. 12, the hydraulic cylinder 180 is illustrated. The base end 182 of hydraulic cylinder 180 has a threaded stud 304 extending therefrom. The rod end 184 of hydraulic cylinder 180 has a washer or disc 306 secured thereto which is spaced inwardly of the threaded portion 308. In FIG. 12, the numeral 310 refers to a bracket which is secured to the frame member 68 by welding and which has an opening 312 formed therein.

A resilient ring or mount 314 is slipped onto the stud 304 so as to be positioned against the base end 182 of hydraulic cylinder 180. The numeral 316 refers to a resilient ring or mount having a hub portion 317 extending therefrom. Hub portion 317 is positioned in opening 312 of bracket 310. Stub 304 is then extended through the mount 316. Washer 318 is then slipped onto stud 304. Nut 320 is then threadably secured to stud 304. As seen in FIG. 12, the bracket 110 has an opening 324 formed therein. Resilient ring or mount 326 is slipped onto the threaded portion 308 so as to be positioned against disc 306. The numeral 328 refers to a resilient ring or mount having a hub portion 329 extending therefrom. Hub portion 329 is inserted into the opening 324 of bracket 110. The threaded portion 308 is then extended through ring or mount 328. Washer 330 is then slipped onto threaded portion 308 and nut 332 is then threadably secured to threaded portion 308. Bracket 110, if not already secured to entrance gate 96, will be secured to entrance gate by bolts 334 and 336 extending through bolt openings 338 and 340 respectively. The resilient rings or mounts are preferably constructed of rubber or the like. It is preferred that all of the hydraulic cylinders utilize the resilient mounts at the base ends and rod ends thereof.

The numeral 342 refers to a neck stretcher assembly which is provided at the exit end of the frame 12. Assembly 342 comprises an elongated pipe 344 having the upper end pivotally secured to a bracket 346 which is secured to the upper end of support 138 about a horizontal axis. Hydraulic cylinder 348 is pivotally connected at its base end to bracket 346 and has its rod end secured to clamp 349 on pipe 342 at 350. Assembly 342 also includes an elongated pipe 352 having its upper end pivotally secured to a bracket 354 which is secured to the upper end of support 154 about a horizontal axis. Hydraulic cylinder 356 is pivotally connected at its base end to bracket 354 and has its rod end secured to clamp 357 on pipe 352 at 358. Quick-release levers 360 and 362 are secured to clamps 349 and 357 so that clamps 349 and 357 may be quickly released from clamping engagement with pipes 344 and 352 respectively. The quick-release levers 360 and 362 are cam devices on the clamps 349 and 357 respectively which allow the pipes 344 and 352 to "break-away" from the hydraulic cylinders 348 and 356 respectively in the event that an animal gets its head stuck behind the pipes 344 and 352 so that the pipes 344 and 352 may be pivotally moved to a horizontal position to release the animal without injury. The quick-release levers 360 and 362 also allow the operator to reset the neck stretcher pipes 344 and 352 in the operating position without tools. An upstanding abdomen support 364 is secured to the floor of the frame 12 at the exit end thereof.

A segmented boom 366 is pivotally or rotatably secured to the frame member 38 at the mid-point thereof for supporting hydraulic lines and a control panel 368 having four valve levers 370, 372, 374 and 376. The operator can move the control panel 368 to any location around the chute 10. The valve lever 370 controls the operation of the hydraulic cylinders 168, 174, 180 and 186 to open and close the entrance gate members 96 and 112. The valve lever 372 controls the operation of the hydraulic cylinders 192, 198, 204 and 210 to open and close the exit gate members 128 and 144. The valve lever 370 controls the operation of the hydraulic cylinders 226, 234, 242, 252, 258, 266, 274 and 282 to move the sidewalls 216 and 216' inwardly and outwardly with respect to the frame 12. The valve lever 376 controls the operation of the hydraulic cylinders 348 and 356 to pivotally move the neck stretcher pipes 344 and 352. When the exit gate members 128 and 134 are in the closed position, the extension of the rods of hydraulic cylinders 348 and 356 causes the lower ends of the neck stretcher pipes 344 and 352 to move outwardly so as to engage the lower rearward portion of the animal's head and extend the same in an upward and outward direction to immobilize the animal's head in an operable position.

Figure 14:
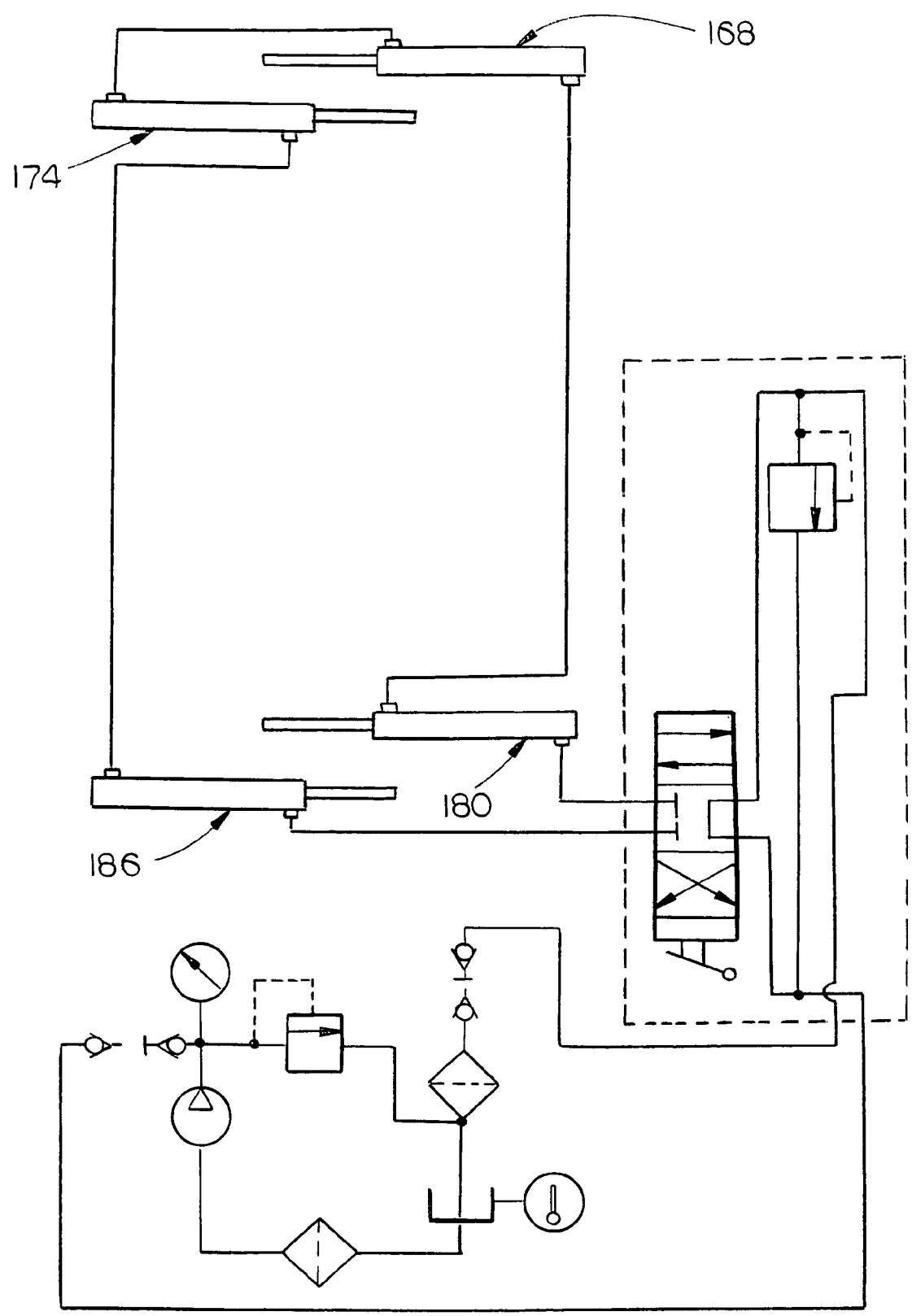
FIG. 14 is a schematic view of four of the hydraulic cylinders and their hydraulic circuitry.

FIG. 14 illustrates the manner in which the hydraulic cylinders 180, 168, 174 and 186 are fluidly connected in series. As hydraulic cylinder 180 is extended, the hydraulic fluid forwardly of the piston in cylinder 180, is forced into cylinder 168 to cause the cylinder rod of cylinder 168 to extend which causes the hydraulic fluid in cylinder 168, which is forwardly of the piston therein, to be forced from the cylinder 168 to cylinder 174 which causes fluid to be fed to cylinder 186. Thus, the cylinders 180, 168, 174 and 186 are simultaneously extended. When the cylinders 180, 168, 174 and 186 are to be retracted, hydraulic fluid is pumped to cylinder 186 which causes fluid to be forced into cylinder 174 which forces fluid into cylinder 168 which forces fluid into cylinder 180 to simultaneously retract the cylinders 186, 174, 168 and 180. Preferably cylinder 180 should have a 2.25" base and a 1.00" rod; cylinder 174 should have a 1.75" base and a 0.875" rod; and cylinder 186 should have a 1.50" base and a 0.75" rod. The operation of the cylinders 180, 168, 174 and 186, described above, causes the entrance gate members 96 and 112 to simultaneously move to their open and closed positions.

Figure 15:
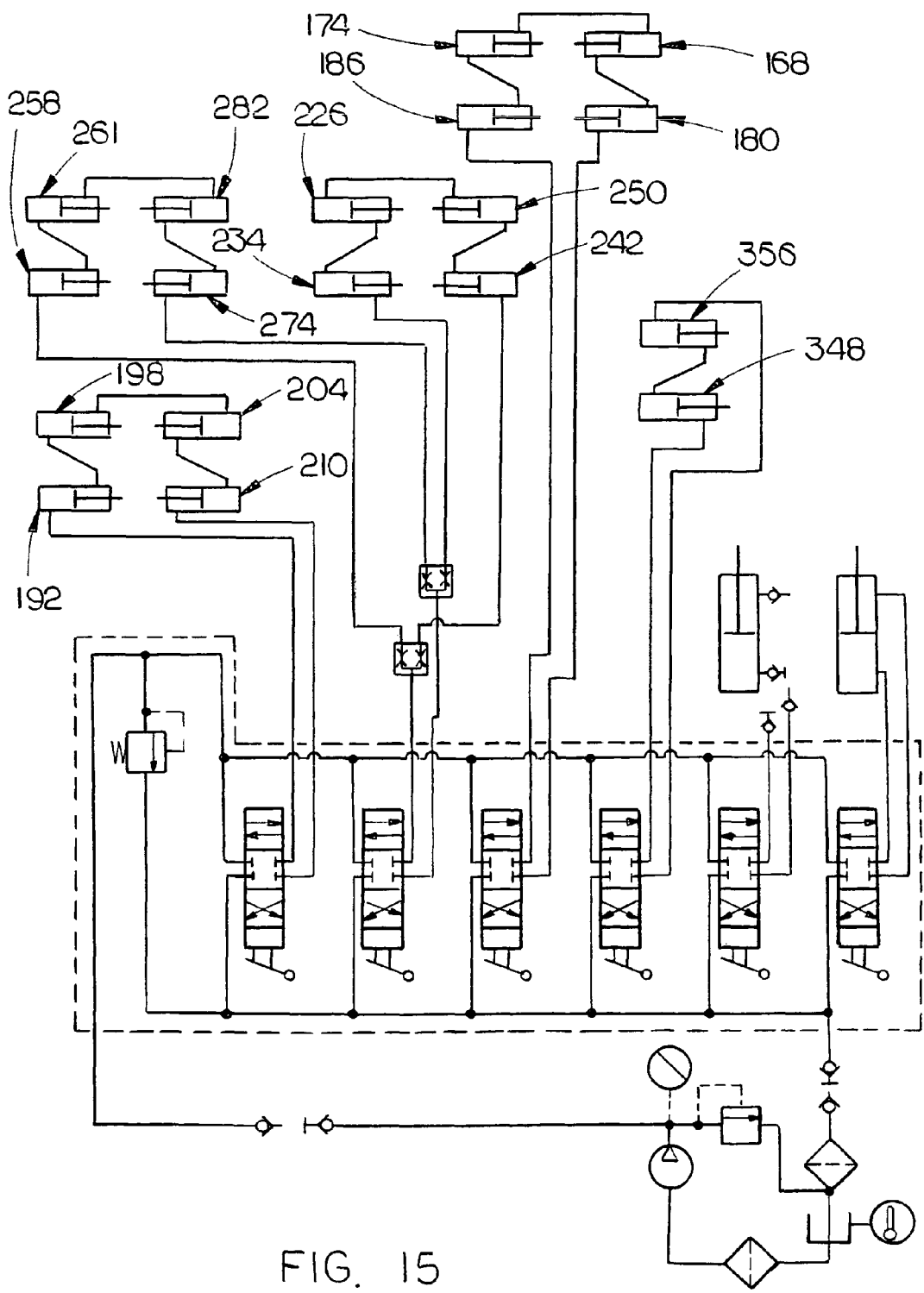
FIG. 15 is a schematic view of all the hydraulic cylinders and the hydraulic circuitry associated therewith.

The hydraulic cylinders 198, 192, 210 and 204 are fluidly connected together in series in the same manner as that described with respect to the cylinders 186, 174, 168 and 180 so that the exit gate members 128 and 144 are moved to their open and closed position in a simultaneous manner. The hydraulic cylinder 234, 228, 242, 250, 258, 266, 274 and 282 are also fluidly connected together in series so that the sidewalls 216 and 216' are moved between their open and closed positions in a simultaneous manner. FIG. 15 is a schematic of the hydraulic circuitry of the invention. FIG. 15 illustrates the necessary hydraulic cylinders which are required if the squeeze chute is portable.

The squeeze chute of this invention is used as follows. Initially, the exit gate members 128 and 144 will be in the closed position of FIG. 6 with the neck stretcher pipes 344 and 352 being in the vertical position of FIG. 6. The sidewalls 216 and 216' will be in their outer non-squeezing position. Entrance gate members 96 and 112 will be in the open position. The exit ramp 62 will be in its operative working position as illustrated in FIG. 6. The entrance ramp 58 will be in its operative working position as illustrated in FIG. 1. The operator is able to move the segmented boom 366 to any location around the squeeze chute so as to have a good view of the operation being conducted. At this time, the doors 292 and 300 will be in their closed and latched position.

The animal is then moved into the entrance end of the chute 10, the entrance gates 96 and 112 being closed behind the animal. The exit gate members 128 and 144 will then be partially opened so that the animal may be able to stick its head forwardly through the exit gate members 128 and 144 but is not able to move through the exit end of the chute. As soon as the animal has stuck its head outwardly from between the exit gate members 128 and 144, the exit gate members are closed somewhat to trap the animal's head therebetween. The hydraulic cylinders 348 and 356 are then extended somewhat so that the head of the animal is lifted upwardly and outwardly to immobilize the head of the animal. The sidewalls 216 and 216' are then moved from their outer positions to their inner positions so as to squeeze the animal therebetween. Various tasks may then be performed on the animal by opening the desired doors 292 and 300.

After the various tasks have been performed on the animal, the sidewalls 216 and 216' are moved to their outer position and the hydraulic cylinders 348 and 356 will be retracted so that the pipes 344 and 352 are again in their vertically disposed position. The exit gate members 128 and 144 are then opened so that the animal may leave the chute.

The operation of the various gates, sidewalls and neck stretcher pipes is very smooth and quiet due to the resilient mounts at the base end and the rod end of all of the hydraulic cylinders. The hydraulic circuitry of the various hydraulic cylinders is such that the hydraulic cylinders are moved in a smooth and quiet fashion so that the animal is not spooked by the operation of the various gates, sidewalls, etc.

The squeeze chute 10 of this invention may be stationary or portable. If portable, the frame 12 will have wheels associated therewith which may be raised or lowered. If the squeeze chute 10 is portable, an engine will be utilized to power a hydraulic pump which is fluidly connected to the hydraulic cylinders. If the squeeze chute is of the stationary type, an electric motor could be utilized to power the hydraulic pump.

Thus it can be seen that the squeeze chute apparatus of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A device for working livestock, comprising:

an elongated frame having upper and lower ends, a first side, a second side, an entrance end and an exit end;

a first vertically disposed entrance gate member horizontally movably secured to said frame at said entrance end of said frame;

said first entrance gate member having an upper end, a lower end, a first side and a second side;

said first entrance gate member being movable between open and closed positions generally transversely with respect to said frame;

a second vertically disposed entrance gate member horizontally movably secured to said frame at said entrance end of said frame;

said second entrance gate member having an upper end, a lower end, a first side and a second side;

said second entrance gate member being movable between open and closed positions generally transversely with respect to said frame;

a first generally horizontally disposed hydraulic cylinder having a base end and a rod end;

said base end of said first hydraulic cylinder being secured to said upper end of said frame at said entrance end thereof;

said rod end of said first hydraulic cylinder being secured to said upper end of said first entrance gate member;

a second generally horizontally disposed hydraulic cylinder having a base end and a rod end;

said base end of said second hydraulic cylinder being secured to said upper end of said frame at said entrance end thereof;

said rod end of said second hydraulic cylinder being secured to said upper end of said second entrance gate member;

each of said first and second hydraulic cylinders being movable between retracted and extended positions;
a third generally horizontally disposed hydraulic cylinder having a base end and a rod end;
said base end of said third hydraulic cylinder being secured to said lower end of said frame at said entrance end thereof;
said rod end of said third hydraulic cylinder being secured to said lower end of said first entrance gate member;
a fourth generally horizontally disposed hydraulic cylinder having a base end and a rod end;
said base end of said fourth hydraulic cylinder being secured to said lower end of said frame at said entrance end thereof;
said rod end of said fourth hydraulic cylinder being secured to said lower end of said second entrance gate member;
each of said third and fourth hydraulic cylinders being movable between retracted and extended positions;
the extension of said first and third hydraulic cylinders causing said first entrance gate member to move to said open position;
the retraction of said first and third hydraulic cylinders causing said first entrance gate member to move to said closed position;
the extension of said second and fourth hydraulic cylinders causing said second entrance gate member to move to said open position;
the retraction of said second and fourth hydraulic cylinders causing said second entrance gate member to move to said closed position;
a first vertically disposed exit gate member horizontally movably secured to said frame at said exit end of said frame;
said first exit gate member having an upper end, a lower end, a first side and a second side;
said first exit gate member being movable between open and closed positions generally transversely with respect to said frame;
a second vertically disposed exit gate member horizontally movably secured to said frame at said exit end of said frame;
said second exit gate member having an upper end, a lower end, a first side and a second side;
said second exit gate member being movable between open and closed positions generally transversely with respect to said frame;
a fifth generally horizontally disposed hydraulic cylinder having a base end and a rod end;
said base end of said fifth hydraulic cylinder being secured to said upper end of said frame at said exit end thereof;
said rod end of said fifth hydraulic cylinder being secured to said upper end of said first entrance gate member;
a sixth generally horizontally disposed hydraulic cylinder having a base end and a rod end;
said base end of said sixth hydraulic cylinder being secured to said upper end of said frame at said entrance end thereof;
said rod end of said sixth hydraulic cylinder being secured to second exit gate member;
each of said fifth and sixth hydraulic cylinders being movable between retracted and extended positions;
a seventh generally horizontally disposed hydraulic cylinder having a base end and a rod end;
said base end of said seventh hydraulic cylinder being secured to said lower end of said frame at said exit end thereof;
said rod end of said seventh hydraulic cylinder being secured to said lower end of said first exit gate member;
an eighth generally horizontally disposed hydraulic cylinder having a base end and a rod end;
said base end of said eighth hydraulic cylinder being secured to said lower end of said frame at said exit end thereof;
said rod end of said eighth hydraulic cylinder being secured to said lower end of said second exit gate member;
each of said seventh and eighth hydraulic cylinders being movable between retracted and extended positions;
the extension of said fifth and seventh hydraulic cylinders causing said first exit gate member to move to said open position;
the retraction of said fifth and seventh hydraulic cylinders causing said first exit gate member to move to said closed position;
the extension of said sixth and eighth hydraulic cylinders causing said second exit gate member to move to said open position;
the retraction of said sixth and eighth hydraulic cylinders causing said second exit gate member to move to said closed position;
a first sidewall operative movably secured to said frame at said first side thereof between said entrance and exit ends thereof;
said first sidewall having an upper end, a lower end, an entrance end and an exit end;
said first sidewall being selectively movable in a generally transverse direction with respect to said frame between open and closed positions;
a second sidewall operatively movably secured to said frame at said second side thereof between said entrance and exit ends thereof;
said second sidewall having an upper end, a lower end, an entrance end and an exit end;
said second sidewall being selectively movable in a generally transverse direction with respect to said frame between open and closed positions;
a ninth generally horizontally disposed hydraulic cylinder having a base end and a rod end;
said base end of said ninth hydraulic cylinder being secured to said upper end of said frame at said entrance end thereof;
said rod end of said ninth hydraulic cylinder being secured to said upper end of said first sidewall at said entrance end thereof;
a tenth generally horizontally disposed hydraulic cylinder having a base end and a rod end;
said base end of said tenth generally disposed hydraulic cylinder being secured to said upper end of said frame at said entrance end thereof;
said rod end of said tenth hydraulic cylinder being secured to said upper end of said second sidewall at said entrance end thereof;
each of said ninth and tenth hydraulic cylinders being movable between retracted positions;
an eleventh generally horizontally disposed hydraulic cylinder having a base end and a rod end;
said base end of said eleventh hydraulic cylinder being secured to said lower end of said frame at said entrance end thereof;
said rod end of said eleventh hydraulic cylinder being secured to said lower end of said first sidewall at said entrance end thereof;
a twelfth generally horizontally disposed hydraulic cylinder having a base end and a rod end;

said base end of said twelfth hydraulic cylinder being secured to said lower end of said second sidewall at said entrance end thereof;

each of said eleventh and twelfth hydraulic cylinders being movable between retracted and extended positions;

a thirteenth generally horizontally disposed hydraulic cylinder having a base end and a rod end;

said base end of said thirteenth hydraulic cylinder being secured to said upper end of said frame at said exit end thereof;

said rod end of said thirteenth hydraulic cylinder being secured to said upper end of said first sidewall at said exit end thereof;

a fourteenth generally horizontally disposed hydraulic cylinder having a base end and a rod end;

said base end of said fourteenth hydraulic cylinder being secured to said upper end of said frame at said exit end thereof;

said rod end of said fourteenth hydraulic cylinder being secured to said upper end of said second sidewall at said exit end thereof;

each of said thirteenth and fourteenth hydraulic cylinders being movable between retracted and extended positions;

a fifteenth generally horizontally disposed hydraulic cylinder having a base end at a rod end;

said base end of said fifteenth hydraulic cylinder being secured to said lower end of said frame at said exit end thereof;

said rod end of said fifteenth hydraulic cylinder being secured to said lower end of said first sidewall at said exit end thereof;

a sixteenth generally horizontally disposed hydraulic cylinder having a base end and a rod end;

said base end of said sixteenth hydraulic cylinder being secured to said lower end of said frame at said exit end thereof;

said rod end of said sixteenth hydraulic cylinder being secured to said lower end of said second sidewall at said exit end thereof;

each of said fifteenth and sixteenth hydraulic cylinders being movable between retracted positions;

the extension of said ninth, eleventh, thirteenth and fifteenth hydraulic cylinders causing said first sidewall to move to said open position;

the retraction of said ninth, eleventh, twelfth and fifteenth hydraulic cylinders causing said first sidewall to move to said closed position;

the extension of said tenth, twelfth, fourteenth and sixteenth hydraulic cylinders causing said second sidewall to move to said open position;

the retraction of said tenth, twelfth, fourteenth and sixteenth hydraulic cylinders causing said second sidewall to move to said closed position.

2. The device of claim 1 wherein all of said base ends of all of said hydraulic cylinders are secured to said frame by resilient mounts.

3. The device of claim 1 wherein at least some of said base ends of said hydraulic cylinders are secured to said frame by resilient mounts.

4. The device of claim 1 wherein said rod ends of said first and third hydraulic cylinders are secured to said first entrance gate member by resilient mounts and wherein said rod ends of said second and fourth hydraulic cylinders are secured to said second entrance gate member by resilient mounts and wherein said rod ends of said fifth and seventh hydraulic cylinders are secured to said first exit gate member by resilient mounts and wherein said rod ends of said sixth and eighth hydraulic cylinders are secured to said second exit gate member by resilient mounts.

5. The device of claim 1 wherein said rod ends of said ninth, eleventh, thirteenth and fifteenth hydraulic cylinders are secured to said first sidewall by resilient mounts.

6. The device of claim 1 wherein said rod ends of said tenth, twelfth, fourteenth and sixteenth hydraulic cylinders are secured to said second sidewall by resilient mounts.

7. The device of claim 1 wherein said entrance gate members, said exit gate members, said first sidewall and said second sidewall are supported by rollers.

8. The device of claim 1 further including a hydraulically operated neck stretcher assembly at said exit end of said frame.

9. The device of claim 8 wherein said neck stretcher assembly includes a break-away mechanism.

10. The device of claim 1 wherein said first, second, third and fourth hydraulic cylinders are fluidly connected in series.

11. The device of claim 1 wherein said fifth, sixth, seventh and eighth hydraulic cylinders are fluidly connected in series.

12. The device of claim 1 wherein said ninth, tenth, eleventh and twelfth hydraulic cylinders are fluidly connected in series.

13. The device of claim 1 wherein said thirteenth, fourteenth, fifteenth, sixteenth hydraulic cylinders are fluidly connected in series.

14. A device for working livestock, comprising:

an elongated frame having upper and lower ends, a first side, a second side, an entrance end and an exit end;

an elongated generally horizontally disposed base;

said base being operatively secured to said frame on said lower end thereof;

a first vertically disposed entrance gate member horizontally movably secured to said frame at said entrance end of said frame;

said first entrance gate member having an upper end, a lower end, a first side and a second side;

said first entrance gate member being movable between open and closed positions generally transversely with respect to said frame;

a second vertically disposed entrance gate member horizontally movably secured to said frame at said entrance end of said frame;

said second entrance gate member having an upper end, a lower end, a first side and a second side;

said second entrance gate member being movable between open and closed positions generally transversely with respect to said frame;

a first generally horizontally disposed hydraulic cylinder having a base end and a rod end;

said base end of said first hydraulic cylinder being secured to said upper end of said frame at said entrance end thereof;

said rod end of said first hydraulic cylinder being secured to said upper end of said first entrance gate member;

a second generally horizontally disposed hydraulic cylinder having a base end and a rod end;

said base end of said second hydraulic cylinder being secured to said upper end of said frame at said entrance end thereof;

said rod end of said second hydraulic cylinder being secured to said upper end of said second entrance gate member;

each of said first and second hydraulic cylinders being movable between retracted and extended positions;

a third generally horizontally disposed hydraulic cylinder having a base end and a rod end;
said base end of said third hydraulic cylinder being secured to said lower end of said frame at said entrance end thereof;
said rod end of said third hydraulic cylinder being secured to said lower end of said first entrance gate member;
a fourth generally horizontally disposed hydraulic cylinder having a base end and a rod end;
said base end of said fourth hydraulic cylinder being secured to said lower end of said frame at said entrance end thereof;
said rod end of said fourth hydraulic cylinder being secured to said lower end of said second entrance gate member;
each of said third and fourth hydraulic cylinders being movable between retracted and extended positions;
the extension of said first and third hydraulic cylinders causing said first entrance gate member to move to said open position;
the retraction of said first and third hydraulic cylinders causing said first entrance gate member to move to said closed position;
the extension of said second and fourth hydraulic cylinders causing said second entrance gate member to move to said open position;
the retraction of said second and fourth hydraulic cylinders causing said second entrance gate member to move to said closed position;
a first vertically disposed exit gate member horizontally movably secured to said frame at said exit end of said frame;
said first exit gate member having an upper end, a lower end, a first side and a second side;
said first exit gate member being movable between open and closed positions generally transversely with respect to said frame;
a second vertically disposed exit gate member horizontally movably secured to said frame at said exit end of said frame;
said second exit gate member having an upper end, a lower end, a first side and a second side;
said second exit gate member being movable between open and closed positions generally transversely with respect to said frame;
a fifth generally horizontally disposed hydraulic cylinder having a base end and a rod end;
said base end of said fifth hydraulic cylinder being secured to said upper end of said frame at said exit end thereof;
said rod end of said fifth hydraulic cylinder being secured to said upper end of said first entrance gate member;
a sixth generally horizontally disposed hydraulic cylinder having a base end and a rod end;
said base end of said sixth hydraulic cylinder being secured to said upper end of said frame at said entrance end thereof;
said rod end of said sixth hydraulic cylinder being secured to second exit gate member;
each of said fifth and sixth hydraulic cylinders being movable between retracted and extended positions;
a seventh generally horizontally disposed hydraulic cylinder having a base end and a rod end;
said base end of said seventh hydraulic cylinder being secured to said lower end of said frame at said exit end thereof;
said rod end of said seventh hydraulic cylinder being secured to said lower end of said first exit gate member;
an eighth generally horizontally disposed hydraulic cylinder having a base end and a rod end;
said base end of said eighth hydraulic cylinder being secured to said lower end of said frame at said exit end thereof;
said rod end of said eighth hydraulic cylinder being secured to said lower end of said second exit gate member;
each of said seventh and eighth hydraulic cylinders being movable between retracted and extended positions;
the extension of said fifth and seventh hydraulic cylinders causing said first exit gate member to move to said open position;
the retraction of said fifth and seventh hydraulic cylinders causing said first exit gate member to move to said closed position;
the extension of said sixth and eighth hydraulic cylinders causing said second exit gate member to move to said open position;
the retraction of said sixth and eighth hydraulic cylinders causing said second exit gate member to move to said closed position;
a first sidewall operative movably secured to said frame at said first side thereof between said entrance and exit ends thereof;
said first sidewall having an upper end, a lower end, an entrance end and an exit end;
said first sidewall being selectively movable in a generally transverse direction with respect to said frame between open and closed positions;
a second sidewall operatively movably secured to said frame at said second side thereof between said entrance and exit ends thereof;
said second sidewall having an upper end, a lower end, an entrance end and an exit end;
said second sidewall being selectively movable in a generally transverse direction with respect to said frame between open and closed positions.

15. The device of claim 14 wherein all of said base ends of all of said hydraulic cylinders are secured to said frame by resilient mounts.

16. The device of claim 14 wherein at least some of said base ends of said hydraulic cylinders are secured to said frame by resilient mounts.

17. The device of claim 14 wherein said rod ends of said first and third hydraulic cylinders are secured to said first entrance gate member by resilient mounts and wherein said rod ends of said second and fourth hydraulic cylinders are secured to said second entrance gate member by resilient mounts and wherein said rod ends of said fifth and seventh hydraulic cylinders are secured to said first exit gate member by resilient mounts and wherein said rod ends of said sixth and eighth hydraulic cylinders are secured to said second exit gate member by resilient mounts.

18. The device of claim 14 wherein said fifteenth, second, third and fourth hydraulic cylinders are fluidly connected in series.

19. The device of claim 14 wherein said fifth, sixth, seventh and eighth hydraulic cylinders are fluidly connected in series.

* * * * *